UNITED STATES PATENT OFFICE.

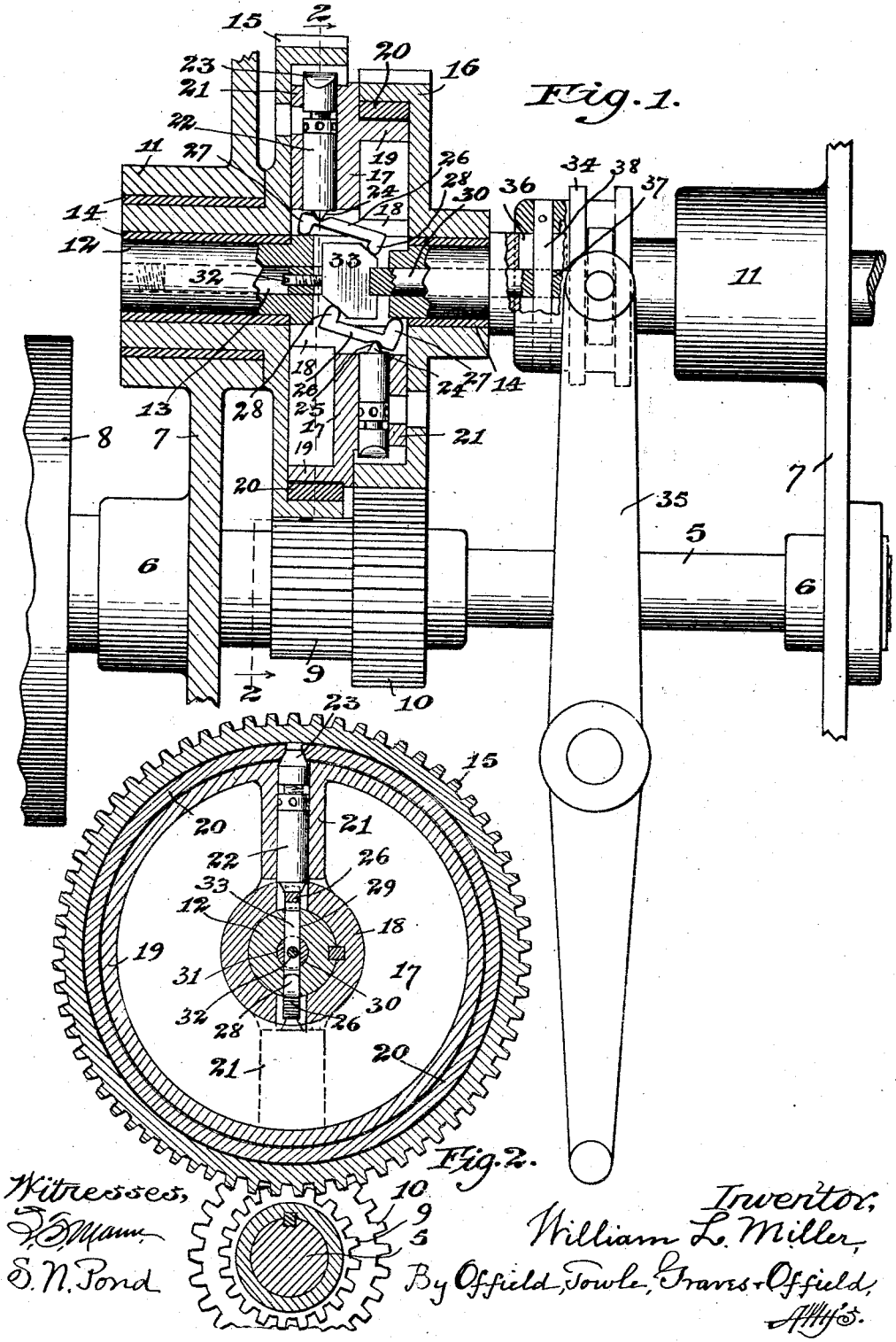

WILLIAM L. MILLER, OF MADISON, WISCONSIN, ASSIGNOR TO GISHOLT MACHINE COMPANY, OF MADISON, WISCONSIN, A CORPORATION OF WISCONSIN.

CLUTCH MECHANISM.

1,062,840.

Specification of Letters Patent.

Patented May 27, 1913.

Application filed March 23, 1912. Serial No. 685,783.

*To all whom it may concern:*

Be it known that I, WILLIAM L. MILLER, a citizen of the United States, residing at Madison, in the county of Dane and State of Wisconsin, have invented certain new and useful Improvements in Clutch Mechanisms, of which the following is a specification.

This invention relates to improvements in clutch mechanisms, and has reference more particularly to clutch mechanisms of what are known as the expansion ring type; and my invention is more immediately concerned with a new and improved mechanism for effecting the application and release of the clutch.

My present improvements have been designed more particularly for use on or in connection with the back-gear mechanism of lathes and similar machines, although applicable generally to any situation wherein this type of clutch may be employed.

Among the objects of my invention are; to effect an economy in the space required for the clutch-operating or controlling mechanism; to provide a mechanism conveniently adaptable to alternately acting clutches located side-by-side on the same shaft and providing for the engagement of either of such adjacent clutches, or the disengagement of both, by a limited movement of the clutch-controlling mechanism; and, generally, to provide a simple, highly efficient, and improved clutch mechanism of the type referred to.

In the accompanying drawing I have illustrated one practical form in which the principle of the invention may be embodied, and a form well adapted for use in connection with the variable speed gears of the back-gear train of a lathe, in which—

Figure 1 is a view, partly in elevation and partly in vertical section of my clutch mechanism and its immediately coöperating parts; and Fig. 2 is a transverse section on the line 2—2 of Fig. 1.

Referring to the drawings, 5 may designate the power shaft of a machine, such as a lathe, to which my present improvements are applicable, the same being mounted in suitable bearings 6 carried by frame members 7, and provided with a driving pulley 8. Fast on the shaft 5 are variable-speed driving gears 9 and 10, the latter being of greater diameter than the former. Suitably journaled in other bearings 11 on the frame members 7 is a counter-shaft 12 which, in the application of the invention to a lathe, may be assumed to be the back-gear shaft. This shaft 12 is formed with an axial bore 13 extending some distance inwardly of one end thereof, as shown. Loosely journaled on the shaft 12, through hardened metal bushings 14, are a pair of driven gears 15 and 16 of different diameters, the larger gear 15 meshing with the smaller driving gear 9, and the smaller gear 16 meshing with the larger driving gear 10. 17 designates a clutch member formed with a longitudinally slotted hub 18 that is fast on the shaft 12, and lies between and within the opposed hollow faces of the gears 15 and 16. This clutch member 17 has lateral flanges 19 on its opposite sides supporting split expansion rings 20 that are adapted, when expanded, to frictionally engage the inner peripheries of the gears 15 and 16, and also radial bearings 21 in which are slidably mounted expansion plugs 22. The expansion plugs 22 are, as herein shown, so constructed as to be capable of a limited adjustment as to length; but as this form of clutch, including such extensible expansion plugs is old and well known and in itself forms no part of my present invention, the same need not be herein further described. The outer end of each plug is beveled or tapered, as shown at 23, and enters, wedge-fashion, between the adjacent ends of the expansion ring 20, in the manner clearly shown in Fig. 2, the outward movement of the plug expanding the ring into frictional engagement with the inner periphery of the gear, and thereby locking the latter to the clutch member 17 and, through the latter, to the shaft 12. The inner end of the expansion plug is formed with a beveled or tapered point 24 which rests in a notch 25 formed in the outer edge of a lever 26. Each lever 26, of which two are herein shown, is formed at one end with a nose 27 that fulcrums upon the outer surface of the shaft 12, and at the other end with a nose 28 that engages a cam hereinafter described.

That portion of the shaft 12 lying within the hub 18 of the clutch-spider 17 is formed with a transverse slot 29, in which the ends 28 of the levers 26 lie. Slidably mounted in the bar 13 of the shaft 12 is a rod 30, and the portion of said rod which extends across the slot 29 of the shaft 12 is formed with a similar, but somewhat narrower, transverse slot 31; and keyed in this slot 31, as by a screw 32, is a double-ended cam plate 33, the upper and lower ends of which also lie within the slot 29 of the shaft 12, and engage, by their inclined or cam surfaces, the noses 28 of the expansion plug levers 26, in the manner clearly shown in Fig. 1. When the cam 33 occupies the intermediate or idle position shown in Fig. 1, both expansion rings are disengaged from the gears 15 and 16, and consequently no rotation is imparted to the shaft 12. When the cam 33 is shifted bodily to the right from the position shown in Fig. 1, the expansion ring 20 pertaining to the gear 15 is forced into frictional contact with the said gear, thereby locking the latter to the shaft 12, the latter being then driven by the gears 9 and 15. When the cam 33 is shifted bodily to the left from the position shown in Fig. 1, the expansion ring pertaining to the gear 16 is placed in driving relation to the latter gear, so that the shaft 12 is then driven through the gears 10 and 16.

The rod 30 may be actuated in any way to effect the bodily shifting of the cam 33, but is preferably actuated by the following mechanism. Slidably mounted upon the shaft 12 between the hub of the gear 16 and the bearing 11 is a circumferentially grooved collar 34 engaged by the upper end of a clutch-shifting lever 35. That portion of the shaft surrounded by the collar 34 is formed with a transverse slot 36; and that portion of the rod 30 which extends through the slot 36 is likewise transversely slotted, as shown at 37. Through the slots 36 and 37, and snugly fitting the latter, extends a crossbar or pin 38, the ends of which are fast in the collar 34. By this means, when the lever 35 is thrown to one side or the other, the rod 30 and the cam 33 carried thereby are shifted longitudinally, relatively to the shaft 12, to a sufficient extent to actuate the clutches in the manner described; it being understood that both the slots 29 and 36 in the shaft 12 are of sufficient width to permit the maximum required movement of the cam 33 and pin 38.

From the foregoing it will be seen that, by locating the actuating or controlling mechanism of the clutches largely within the shaft itself, a considerable economy of space is effected, permitting, in the case of a pair of alternately acting clutches, the placing of said clutches and the gears affected thereby in close juxtaposition, and to that extent reducing the required length of the shaft 12, which, where a considerable number of clutch-controlled gears or like devices are placed on a single shaft, is considerable.

While I have shown the invention as applied to or embodied in a double or alternately acting clutch mechanism, it will be apparent that the same is equally applicable to a single-acting clutch mechanism, and, further, that the detail construction and arrangement may be somewhat varied from that shown without departing from the principle or sacrificing any of the advantages of the invention.

It will be further evident that, while I have shown the clutch-controlled members 15 and 16 as spur gears driven by the coöperating spur gears 9 and 10; yet the said members might be belt-driven pulleys or sprocket-wheels, or analogous elements, within the purview of the invention.

The term "expansion ring clutch mechanism," as used in the appended claims, is intended to designate and include the expansion ring 20, the radial plugs 22, the carrier 17, and the plug-actuating levers 26, or their equivalents.

I claim—

1. In combination, an axially bored and slotted shaft, a hollow faced gear loose on said shaft, an expansion ring clutch mechanism fast on said shaft within said gear, a cam for actuating said clutch mechanism located within the slot of said shaft, and a rod slidably mounted in the bore of said shaft and connected to said cam for actuating the latter.

2. In combination, an axially bored and transversely slotted shaft, a hollow faced gear loose on said shaft, an expansion ring clutch mechanism fast on said shaft within said gear, a cam for actuating said clutch mechanism located within the slot of said shaft and bodily shiftable lengthwise of the latter, and a rod slidably mounted in the bore of said shaft and carrying said cam.

3. In combination, an axially bored and transversely slotted shaft, a pair of hollow faced gears loose on said shaft, expansion ring clutch mechanisms fast on said shaft within said gears, a double-ended cam for actuating said clutch mechanisms located within the slot of said shaft and bodily shiftable lengthwise of the latter, and a rod slidably mounted in the bore of said shaft and carrying said cam.

4. In combination, an axially bored shaft formed with a pair of transverse slots therein, a hollow faced gear loose on said shaft, an expansion ring clutch mechanism fast on said shaft within said gear, a cam for actuating said clutch mechanism located within one of the slots of said shaft and bodily shiftable lengthwise of the latter, a rod slidably mounted in the bore of said shaft and carrying said cam, said rod extending across both slots of said shaft, a circumferentially grooved collar encircling said shaft opposite the other of said slots, a pin connecting said collar to said rod through said other slot of said shaft, and a clutch-actuating lever engaging said grooved collar.

WILLIAM L. MILLER.

Witnesses:
H. J. PARKE,
RAYMOND ALL.